United States Patent [19]
Howard

[11] Patent Number: 5,227,576
[45] Date of Patent: Jul. 13, 1993

[54] METHOD FOR FORMING COMPLEX PATTERNS IN THE INTERIOR OF A PRESSED PART FORMED OF COMPACTED PARTICULATE MATERIAL, AND APPARATUS

[75] Inventor: Timothy D. Howard, Georgetown, Mass.

[73] Assignee: Industrial Materials Technology, Andover, Mass.

[21] Appl. No.: 846,730

[22] Filed: Mar. 4, 1992

Related U.S. Application Data

[63] Continuation of Ser. No. 700,535, May 14, 1991, abandoned, which is a continuation-in-part of Ser. No. 669,055, Mar. 14, 1991, abandoned.

[51] Int. Cl.⁵ ........................... C06B 21/00; B22F 3/16
[52] U.S. Cl. ........................................ 86/1.1; 419/42; 419/68
[58] Field of Search ................... 86/1.1; 102/491–496; 419/38, 42, 66, 68

[56] References Cited

U.S. PATENT DOCUMENTS

| | | | |
|---|---|---|---|
| 2,933,799 | 4/1960 | Semon | 102/491 |
| 3,577,635 | 5/1971 | Bergman et al. | 29/615 |
| 3,666,454 | 5/1972 | Sarnes | 419/38 |
| 3,757,693 | 9/1973 | Shea | 102/67 |
| 3,907,949 | 9/1975 | Carlson | 264/6 |
| 4,057,001 | 11/1977 | Valentine | 102/67 X |
| 4,341,557 | 7/1982 | Lizenby | 75/223 |
| 4,592,283 | 6/1986 | Hellner et al. | 102/493 |
| 4,729,789 | 3/1988 | Ide et al. | 419/8 |
| 5,012,853 | 5/1991 | Bihlmaier | 167/75 |
| 5,066,454 | 11/1991 | Hanson | 419/42 |

*Primary Examiner*—Charles T. Jordan
*Attorney, Agent, or Firm*—Lahive & Cockfield

[57] ABSTRACT

Method and apparatus whereby complex patterns are pressed into the interior of a part formed of compactible material. A flexible, pre-fabricated pattern form bearing the inverse of a desired pattern is wrapped around a conventional mandrel and this assembly is loaded inside of an isostatic pressing bag with a material charge. After compaction, the mandrel is separated from the pattern form, leaving the pattern form behind in the compact. The pattern form is then peeled, pulled, or otherwise removed from the interior of the compact, leaving behind the desired on the compact interior. Alternatively, a collapsible or melt-away mandrel with the inverse of a desired pattern formed on its exterior is employed to form the desired pattern on the interior of a compacted part.

12 Claims, 5 Drawing Sheets

METHOD FOR FORMING COMPLEX PATTERNS IN THE INTERIOR OF A PRESSED PART FORMED OF COMPACTED PARTICULATE MATERIAL, AND APPARATUS

BACKGROUND OF THE INVENTION

This application is a continuation of application Ser. No. 700,535, filed May 14, 1991 now abandoned. Which is a continuation in-part of abandoned U.S. application Ser. No. 07/669,055, filed Mar. 14, 1991, assigned to the assignee hereof.

The present invention relates to isostatic compaction of particulate (e.g., powder) materials, and more particularly to forming complex patterns on the inside diameter of isostatically compacted parts.

Cold isostatic pressing is one process of choice for forming components from powder materials. In cold isostatic pressing, a powder charge is loaded into an elastomeric mold (called a "bag"). The bag can be considered as a hermetically sealed pressure transfer membrane. The bag is sealed after filling, positioned within the containment vessel, and is exposed to a fluid environment.

The bag may be part of the pressure vessel (dry bag process) or may be a separate, independent unit placed within the pressure vessel (wet bag process). In either case, a mandrel may be included within the bag to aid in forming details on the resulting pressed material.

In operation, the fluid is pressurized and in turn applies a hydrostatic pressure to the bag. If a mandrel is included inside the bag, then the pressure compacts the powder against the mandrel. Upon completion of the pressing process, the vessel and bag are opened and the pressed part (called a "compact") is separated from the mandrel. The compact is then thermally treated, sintered, to increase strength through diffusion bonding, and may also be hot isostatically pressed to final density.

However, removal of the mandrel from the compact may present special difficulty when parts of unusual, complex, or tapered interior are formed by such processing. For this reason, complex patterns are usually machined rather than pressed onto the interior of those parts requiring such patterns.

It is therefore an object of the present invention to provide method and apparatus whereby parts of unusual, complex, or tapered interior can be fabricated in an isostatic process wherein the mandrel is easily removed.

It is another object of the present invention to provide a cold isostatic process for pressing a pattern on the inner diameter of cylindrically shaped parts, such as a complex pattern on the inside of a titanium or other pressed material compact.

SUMMARY OF THE INVENTION

The present invention provides method and apparatus whereby complex patterns can be pressed into the interior of a part formed of compactible material. Such compressed or compacted part may take the form of a generally cylindrical container having a complexly-patterned interior. In one embodiment, a flexible, pre-fabricated pattern form bearing the inverse of a desired pattern is wrapped around a conventional mandrel and this assembly is loaded inside of an isostatic pressing bag with a material charge. After compaction, the mandrel separates from the compact, leaving the pattern form behind in the compact. The pattern form is then peeled, pulled, or otherwise removed from the interior of the compact, leaving behind the impression of the inverse pattern of the pattern form on the compact interior.

The invention generally includes use of a conventional straight or tapered mandrel having a cylindrical outer diameter surface. This surface is wrapped with a pattern form which bears a desired inverse pattern. The pattern form may be a flat sheet of stainless steel, aluminum or plastic, for example, having the inverse pattern formed thereon by means of injection molding for a plastic material or stamping or perforating for metal or plastic sheets. The inverse pattern may also be machined on the flat pattern form.

In a cold isostatic pressing process, this patterned mandrel assembly (i.e., with the pattern form mounted over the mandrel) is loaded into a flexible elastomeric containment bag along with a material charge, all of which is loaded into a pressure containment vessel, and the pressing process proceeds as in a conventional manner. After pressure is relieved from the vessel and the containment bag is opened, the compact (formed from the now pressed powder), the pattern form, and the mandrel, are removed as a unit from the bag.

In order to separate the mandrel from the compact, the mandrel is affixed to a vise-like mount, such as by means of an internal thread at the center of the mandrel, and then the outlying compact is urged or driven off of the mandrel, wherein the pattern form is carried with the compact. The mandrel thus separates from the pattern form while the pattern form remains within the interior of the compact. The pattern form is now accessible and is extracted such as by peeling it out from the compact interior.

This separation of the pattern form from the mandrel is facilitated by use of a glue which disintegrates a) during pressing or b) by heating, or c) over time, or d) is at least so weak as to release easily during the driving of the compact off of the mandrel. Alternatively, the pattern form may be otherwise mounted to the mandrel, such as by use of elastic or heat shrink bands, which release the pattern form from the mandrel during the driving of the compact off of the mandrel.

In one embodiment of the invention, a fragmentation pattern is formed on the inner diameter of a missile warhead. When the missile is detonated at target, the fragmentation pattern causes forming of well-defined shrapnel for maximum target damage. In a particularly preferred embodiment of the invention, a V-grooved triangular pattern is formed on the inner diameter of a Stinger missile warhead during cold isostatic pressing ... This pattern increases the damage which can be done to an airborne target by regularizing the fragments created when the warhead is detonated. The fragmentation pattern is formed on a plastic or metal pattern form, which is wrapped around the mandrel. The pattern form is affixed to the mandrel by means of a special glue (such as Goodyear Pliobond SPRA GLUE adhesive) or other attachment arrangement. Alternatively, the metal pattern form may be rolled to fit snugly around the diameter of the mandrel.

In a particular embodiment, the attachment arrangement includes bands of heat shrink tubing respectively applied to the top and the bottom of the pattern form as placed around the mandrel. The heat shrink is heated and shrunk by means of any conventional heat source so as to fasten the pattern form to the mandrel.

In an alternative embodiment of the invention, a melt-away mandrel having an outer surface formed with the inverse of a desired pattern is used to form a compacted part having the desired pattern formed on its inner diameter. The inverse pattern is formed by casting, machining, or the like on outer diameter of the mandrel. As set forth in U.S. patent application Ser. No. 07/540,683, filed Jun. 20, 1990, entitled ISOSTATIC PROCESSING WITH SHROUDED MELT-AWAY MANDREL, incorporated herein by reference, a process for isostatic pressing of compactible material includes the steps of enclosing a material charge to be compacted and a melt-away mandrel in a flexible containment bag, sealing the bag from a fluid environment in a pressurization vessel, applying pressure via the fluid to the bag to cause hydrostatic compaction of the material against the mandrel, and applying heat to the compacted material and mandrel until the compacted material and mandrel are separated without fracturing or uncompacting the compacted material, whereby a part having complex interior form can be made in an isostatic compaction process. The process may be practiced wherein the compactible material is non-wettable by the heated mandrel. This non-wetting may be achieved by assembling the melt-away mandrel in a flexible sleeve to prevent contamination of the compacted part.

In yet another alternative embodiment of the invention, a collapsible mandrel having an outer surface formed with the inverse of a desired pattern is used to form a compacted part having the desired pattern formed on its inner diameter. The inverse pattern is formed by casting, machining, or the like on the outer diameter of the mandrel. The mandrel is formed by a combination of interfitting segments which form the patterned mandrel exterior, and with a central key portion which is inserted within the combined interfitting segments to hold the assembled segments in a rigid mandrel form. A process for isostatic pressing of compactible material includes the steps of enclosing a material charge to be compacted and a patterned collapsible mandrel in a flexible containment bag, sealing the bag from a fluid environment in a pressurization vessel, applying pressure via the fluid to the bag to cause hydrostatic compaction of the material against the mandrel, and removing the central key portion and the combined interfitting segments until the compacted material and mandrel are separated without fracturing or uncompacting the compacted material, whereby a part having complex interior form can be made in an isostatic compaction process.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF PREFERRED EMBODIMENTS

Various combat ordinance are designed to detonate at or near a target either under control of a proximity fuse or otherwise. When the missile explodes, the warhead is delivered to the target as shrapnel. The Stinger missile warhead, which includes a leading warhead, is designed for detonation at impact, and upon fragments into small, irregularly shaped shrapnel. As a result of this small shrapnel size, the warhead becomes relatively ineffective except for direct impacts.

In practice of an embodiment of the invention, a pattern form, i.e., a sheet having a desired inverse fragmentation pattern, is used in an isostatic compaction process to form a modified Stinger missile warhead. A fragmentation pattern is formed on the interior circumference of the warhead which yields an improved shrapnel effect, i.e., it breaks into larger pieces as determined by the fragmentation pattern. As a result, a proximity fuse may be employed in the warhead since the large shrapnel will have a severely damaging effect upon the target even without direct impact. This improves the effectiveness of the weapon.

Figure 1A:
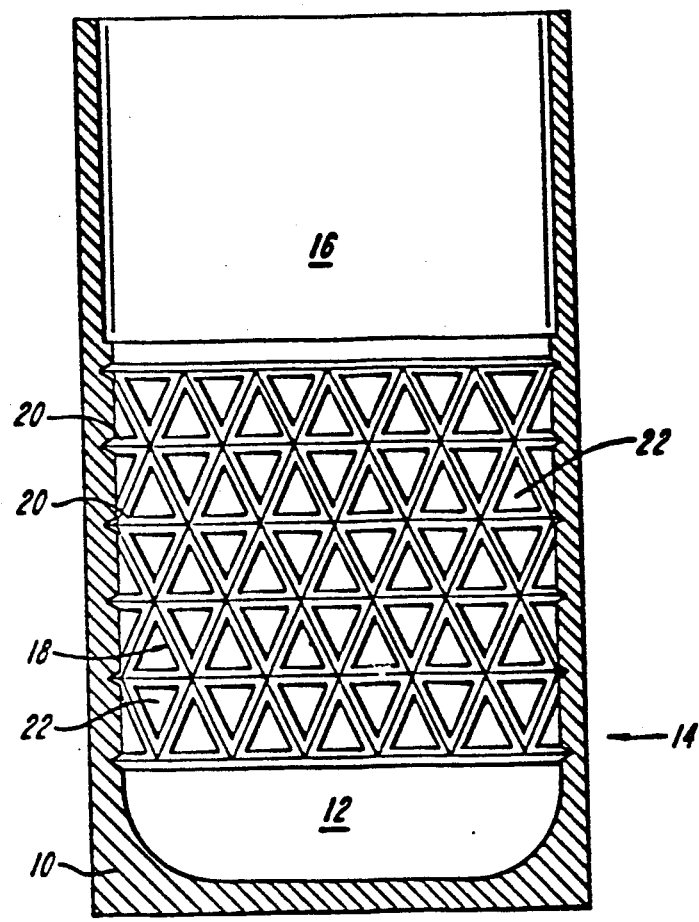
FIGS. 1(a) and 1(b) are a side cross-section (a) of a modified Stinger missile warhead, with a detail (b) showing a V-groove in cross-section.
Figure 1B:
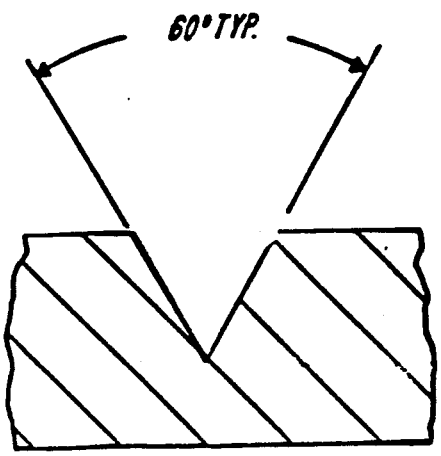

A cross-section of a modified Stinger warhead 10 is shown in FIG. 1(a), whose inner diameter has an undetailed cap area 12, a detailed area 14 and an undetailed proximity fuse and control electronics area 16, the latter being open to receive the propulsion package of the missile. The desired fragmentation pattern 18 includes a plurality of V-grooves 20 which intersect to form a plurality of triangles 22. A typical V-groove 20 is shown in FIG. 1(b). A projection of typical shrapnel approximates in part the formed triangles 22.

Figure 2A:
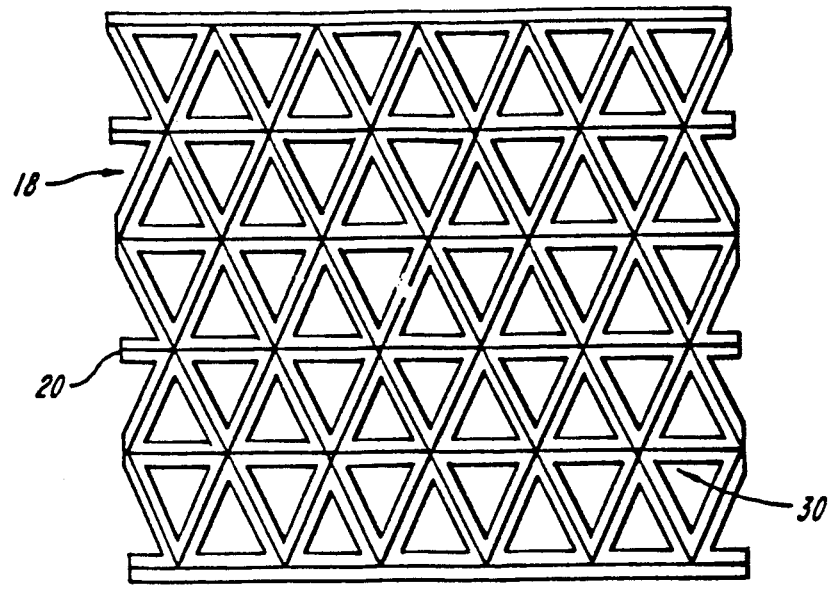
FIGS. 2(a) and 2(b) are a plan view (a) and side view (b) of a pattern form bearing a desired inverse fragmentation pattern.
Figure 2B:
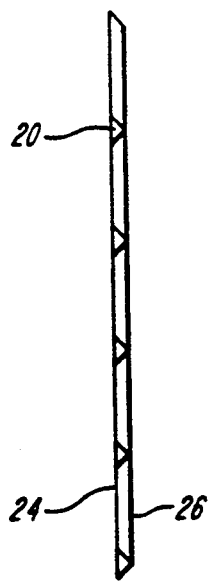

While fragmentation pattern 18 can be machined onto the interior of the warhead, this is a time-consuming and laborious process. As well, mistakes during machining make it an inefficient process. As shown in FIG. 2, these problems are overcome in practice of the present invention wherein the inverse of a fragmentation pattern 18 is formed on a pattern form, i.e., as a pattern imparted to a flat material sheet 30. Hence no untoward machining difficulties arise. In a preferred embodiment, sheet 30 is injection molded plastic with a top surface 26 having the desired inverse fragmentation pattern 18, and a flat bottom surface 24.

The pattern form of FIG. 2 has dimensions as shown. The inverse fragmentation pattern shown was developed in view of a desired fragment size of 0.45", for a warhead inner configuration approximately 8.250" wide by 2.375" high. As a close approximation, triangle bases having a 0.46" pitch were obtained as a result of dividing the length 8.250" (i.e., the warhead inner circumference) by the number 18 (i.e., the whole number of triangle bases which completely fit within a pattern of this dimension). The height of 2.375" is obtained by joining of 5 rows of triangles.

As with any isostatic pressing process, care must be taken to scale the pattern form dimensions to account for dimensional shrinkage which may occur during any subsequent processing (e.g., sintering and hot isostatic processing). Therefore, a shrinkage factor should be determined for the materials being compacted. This may be done simple by forming a preform on a mandrel having a known outer diameter such as a diameter equivalent to the desired inner diameter of the finished product, and then calculating a shrinkage ratio based on the preform's outer (or inner) diameter before and then after post processing steps (i.e., after sintering and hot isostatic pressing). The mandrel can then be scaled up accordingly. The known desired diameter (inner) for the preform after processing divided by the shrinkage factor yields the new mandrel outer diameter.

Figure 3:
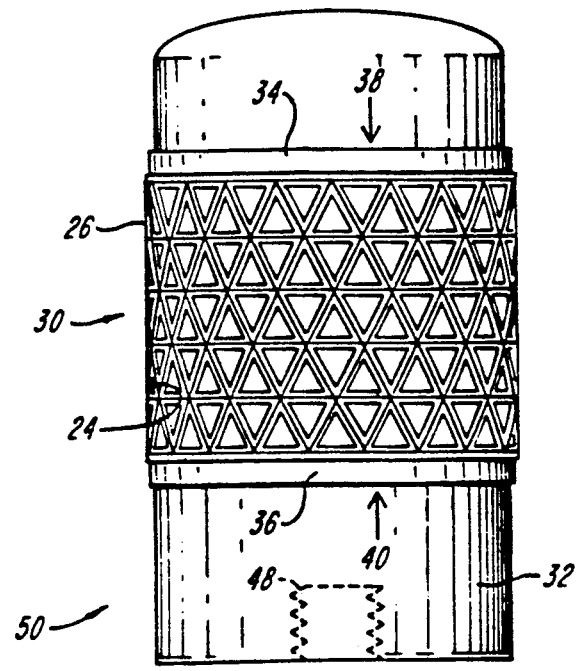
FIG. 3 is a side view of a pattern form mounted on a mandrel.

As shown assembled in FIG. 3, pattern form 30 is wrapped around a mandrel 32 having the general dimension of the warhead interior. In a preferred embodiment, a respective band 34, 36 of thin wall (perhaps 0.001-0.005" thick) heat shrink tubing is placed over the pattern form ends 38, 40 mounted on the mandrel and then the heat shrink material is heated and shrunk to anchor the pattern form onto the mandrel. Mandrel 32 is provided with a threaded orifice (shown in dotted outline) for purposes described below. The patterned mandrel assembly 50 is then loaded into an elastomeric pressing bag with the powder charge, and subjected to cold isostatic compaction. The powder charge is pressed onto the patterned mandrel assembly 50 and therefore adopts the inverse (or "footprint") of the fragmentation pattern 18 on its interior circumference in warhead interior detail area 14.

Figure 4:
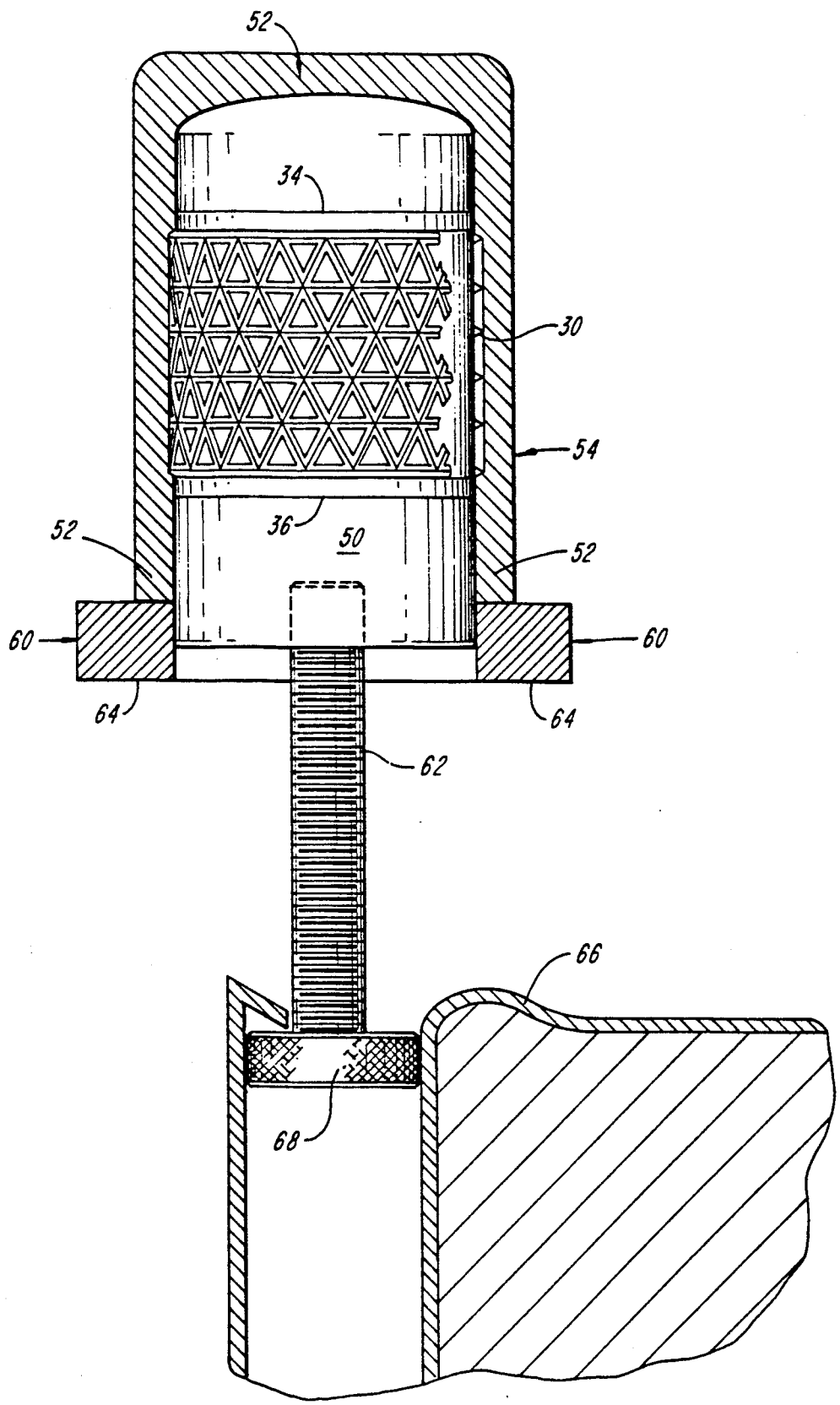
FIG. 4 is a side view of a compact formed over a pattern form on a mandrel in a separation stage.
Figure 5:
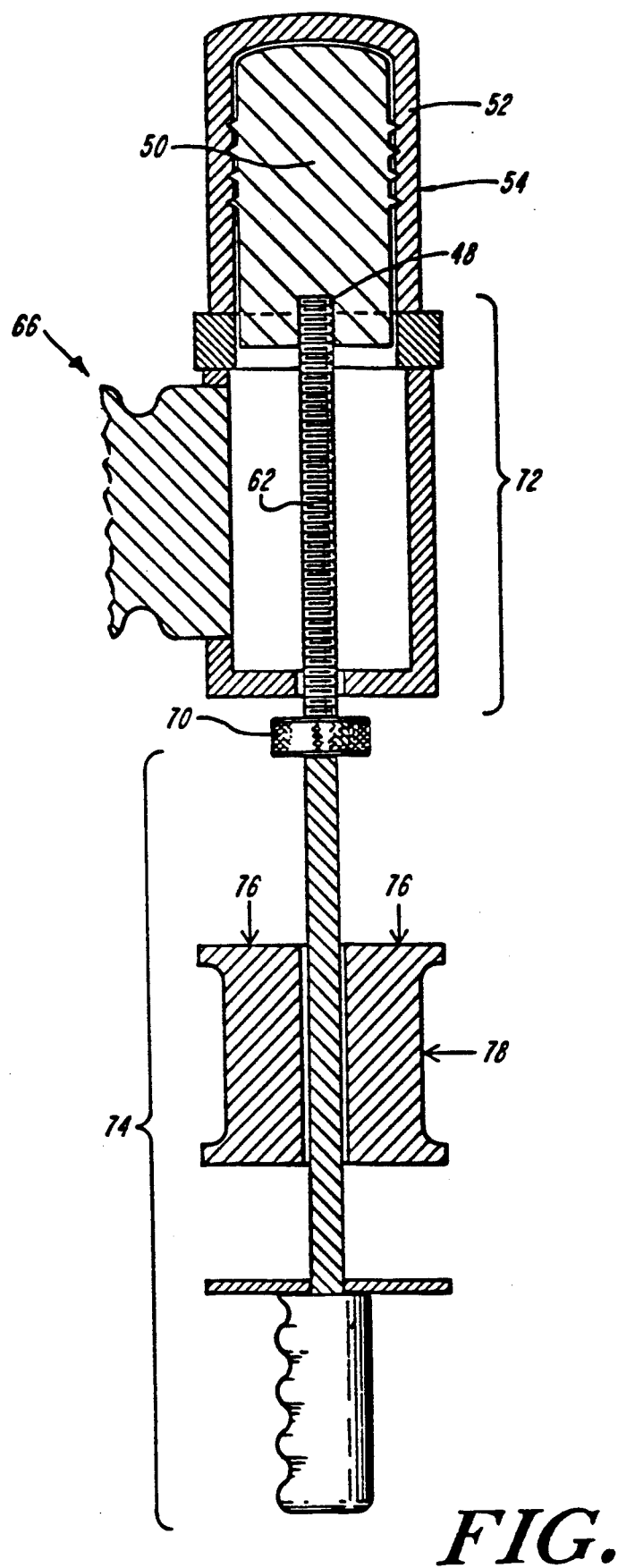
FIG. 5 is a side view of a compact formed over a pattern form on a mandrel in an alternative separation stage.

As shown in FIG. 4, after compaction, the warhead compact 52, having an unfinished exterior 54, must be separated from the mandrel assembly 50 for further processing. Hence, one end of a threaded shaft 62 is threaded into the mandrel threaded orifice 48. The other end of shaft 62 is anchored such as via nut 68 in a vice 66 or the like. Now a suitable collar 60 other hard member is slid over the end of the mandrel and rests against the exposed edge of the compact, and shearing forces are applied to the assembly by hammering against the end of collar 60, as indicated by arrows 64. The heat shrink material 34, 36 (or other attachment means such as glue) gives way under these shearing forces, and the mandrel separates from the pattern form 30 and compact 52. Now the heat shrink bands 34, 36 are removed, and then the pattern form is peeled away from the interior of the compact. Further processing may include sintering and hot isostatic pressing to obtain full density, as well as machining of the exterior of the warhead.

FIG. 4 illustrates another method of mandrel extraction after compaction. As in the earlier mentioned process, a threaded shaft 62 is threaded into the mandrel threaded orifice 48. The shaft runs through an opening in the warhead by means of coupling nut 70 to a slide hammer 74. The warhead compact holder tool 72 is then anchored in a vice, and the slide hammer weight 78 is hammered in direction 76 to apply shearing forces adequate to remove mandrel assembly 50 from warhead compact 52. As before, the heat shrink bands (if employed) are removed, and the pattern form is then removed from the compact interior.

Use of high density polyethylene, polypropylene, or nylon material for pattern forms facilitates their removal from small diameter powder compacts. For larger diameter compacts, a less compressible material such as aluminum or thermo-set plastic may be more desirable to prevent friction locking arising from springback of the compressed plastic of the pattern form between the mandrel and the compact.

Figure 6:
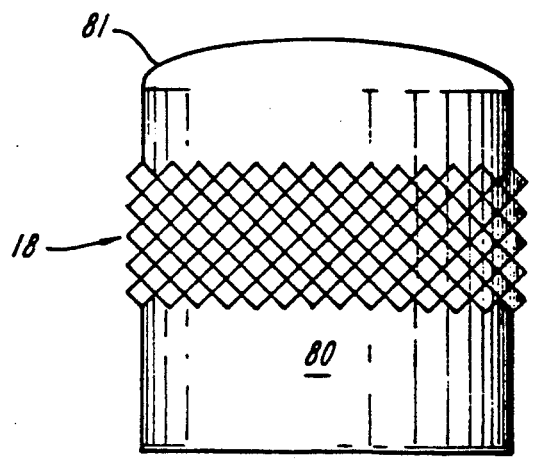
FIG. 6 is a side view of a melt-away mandrel having a patterned outer surface.

In an alternative embodiment of the invention, a melt-away mandrel 80, shown in FIG. 6, has an outer surface 81 having a pattern 18 in the inverse of a desired pattern and located on the side of the mandrel at an elevation coordinate with warhead detailed area 14. The mandrel pattern serves to form a compacted part having the desired pattern formed on its inner diameter, as shown in FIG. 1. The inverse pattern is formed by casting, machining, or the like on outer diameter of the mandrel. In one process for isostatic pressing of compactible material forming an interiorly patterned part includes the steps of enclosing a material charge to be compacted and a melt-away mandrel in a flexible containment bag, sealing the bag from a fluid environment in a pressurization vessel, applying pressure via the fluid to the bag to cause hydrostatic compaction of the material against the mandrel, and applying heat to the compacted material and mandrel until the compacted material and mandrel are separated without fracturing or uncompacting the compacted material, whereby a part having complex interior form can be made in an isostatic compaction process. The process may be practiced wherein the compactible material is non-wettable by the heated mandrel. This non-wetting may be achieved by assembling the melt-away mandrel in a flexible sleeve to prevent contamination of the compacted part.

Figure 7:
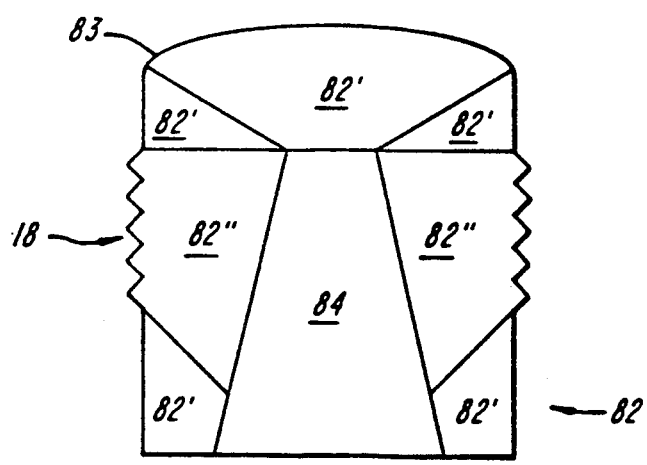
FIG. 7 is a cross-section of an illustrative collapsible mandrel having a patterned outer surface.

In yet another alternative embodiment of the invention, as shown in FIG. 7, a collapsible mandrel 82, having a pattern 18 in the inverse of a desired pattern and located on the side of the mandrel at an elevation coordinate with warhead detailed area 14. The mandrel pattern serves to form a compacted part having the desired pattern formed on its inner diameter, as shown in FIG. 1. The inverse pattern is formed by casting, machining, or the like on outer diameter of the mandrel. The collapsible mandrel includes a combination of interfitting segments 82' and 82" which form the mandrel exterior, pattern 18 being carried by segments 82", and with a key portion 84 being inserted within the combined interfitting segments to hold the assembled segments in a rigid mandrel form. A process for isostatic pressing of compactible material includes the steps of enclosing a material charge to be compacted and a patterned collapsible mandrel in a flexible containment bag, sealing the bag from a fluid environment in a pressurization vessel, applying pressure via the fluid to the bag to cause hydrostatic compaction of the material against the mandrel, and removing the central key portion and the combined interfitting segments until the compacted material and mandrel are separated without fracturing or uncompacting the compacted material, whereby a part having complex interior form can be made in an isostatic compaction process.

It will be understood that the above description pertains to only several embodiments of the present invention. For example, the warhead of other missiles (such as the Patriot, Tomahawk or Slam missiles) can be modified according to the present invention. That is, the description is provided by way of illustration and not by way of limitation. The invention, therefore, is to be defined according to the following claims.

What is claimed is:

1. A method for isostatic compaction of powder materials for forming complex patterns on the inside diameter of isostatically compacted parts, the method comprising the steps of forming segments of a collapsible mandrel having an outer surface formed with the inverse of a desired pattern to form a patterned collapsible mandrel, the mandrel formed by combining together a plurality of interfitting segments secured with a central key portion.

enclosing a material charge to be compacted and the patterned collapsible mandrel in a flexible containment bag, sealing the bag from a fluid environment in a pressurization vessel, applying pressure via the fluid to the bag to cause hydrostatic compaction of the material against the mandrel, and removing the central key portion and the combined interfitting segments until the compacted material and mandrel are separated without fracturing and without uncompacting the compacted material, to form a part having an interior formed according to the desired pattern.

2. Method for isostatic compaction of powder materials for forming complex patterns on the inside diameter of isostatically compacted parts, the method comprising the steps of forming a patterned sheet material form having an inverse pattern thereon to fit about the circumference of a mandrel, forming a compacted part within an isostatic processing container by isostatically compacting a material charge upon the patterned form fitted on the mandrel, removing the mandrel, and removing the patterned form, wherein the compacted part is formed with a pattern on its inside diameter as an impression of the form inverse pattern.

3. The method of claim 2 wherein the step of forming includes affixing the pattern form to the outside of the mandrel using an adhesive.

4. The method of claim 2 wherein the step of forming includes affixing the pattern form to the mandrel with heat shrink material.

5. The method of claim 2 wherein the part is a warhead.

6. The method of claim 2 wherein the compaction is cold isostatic compaction.

7. The method of claim 6 further comprising the steps of sintering and hot isostatic compaction.

8. The method of claim 2 wherein pattern form is peeled from the interior of the compacted part.

9. The method of claim 2 wherein the mandrel is a melt-away mandrel.

10. The method of claim 3 wherein the mandrel is removed by heating the compacted part until the adhesive holding the pattern form to the mandrel melts and releases the mandrel.

11. The method of claim 2 wherein the mandrel has an unpatterned outer surface.

12. The method of claim 2 wherein the mandrel is a collapsible mandrel.

* * * * *